(12) United States Patent
Caruccio et al.

(10) Patent No.: US 12,710,400 B2
(45) Date of Patent: Aug. 18, 2026

(54) DELAY LINE AND METHOD FOR ULTRASONIC INSPECTION OF A WORKPIECE

(71) Applicant: The Boeing Company, Arlington, VA (US)

(72) Inventors: Danielle M. Caruccio, Renton, WA (US); Jill P. Bingham, Seattle, WA (US); Justin Serrill, Issaquah, WA (US); Maninderjit Kaur, Renton, WA (US)

(73) Assignee: The Boeing Company, Arlington, VA (US)

( * ) Notice: Subject to any disclaimer, the term of this patent is extended or adjusted under 35 U.S.C. 154(b) by 521 days.

(21) Appl. No.: 18/349,512

(22) Filed: Jul. 10, 2023

(65) Prior Publication Data

US 2025/0020615 A1 Jan. 16, 2025

(51) Int. Cl.
*G01N 29/28* (2006.01)
*G01N 29/04* (2006.01)
*G01N 29/26* (2006.01)

(52) U.S. Cl.
CPC ............. *G01N 29/28* (2013.01); *G01N 29/04* (2013.01); *G01N 29/262* (2013.01); *G01N 2291/023* (2013.01); *G01N 2291/106* (2013.01)

(58) Field of Classification Search
CPC ..... G01N 29/262; G01N 29/28; G01N 29/225
See application file for complete search history.

(56) References Cited

U.S. PATENT DOCUMENTS 7,975,549 B2 * 7/2011 Fetzer .................... G01N 29/28 73/644
9,733,219 B2 * 8/2017 Spencer ............. G01N 29/0645
2023/0142564 A1 * 5/2023 Faucher ................. G01N 29/28 73/618

OTHER PUBLICATIONS

Olympus Coroporation, Tutorial: "Focusing With Phased Array Probes," downloaded on Apr. 15, 2023.
Olympus Coroporation, Tutorial: "Introduction to Phased Array Ultrasonic Testing," downloaded on Apr. 15, 2023.
Olympus Coroporation, Tutorial: "Phased Array Wedges," downloaded on Apr. 15, 2023.
Olympus Coroporation, Tutorial: "Thickness and Flaw Inspection Solutions," downloaded on Apr. 15, 2023.
Olympus Coroporation, Tutorial: "What Is a Phased Array Transducer?," downloaded on Apr. 15, 2023.

* cited by examiner

*Primary Examiner* — Erika J. Villaluna

(57) ABSTRACT

A delay line is configured to acoustically couple a phased array transducer to a workpiece. The delay line includes a delay line bottom portion, a delay line end portion, and a delay line top portion. The delay line bottom portion has a delay line flat surface. The delay line end portion is contiguous with the delay line bottom portion and has a delay line curved surface extending upwardly from the delay line flat surface at a delay line transition point between the delay line curved surface and the delay line flat surface. The delay line top portion has an array mounting surface configured to support a phased array transducer in a manner such that ultrasonic waves emitted by the phased array transducer pass through the delay line and exit along the delay line flat surface at least up to the delay line transition point.

20 Claims, 17 Drawing Sheets

200
282
256
266
264
208
282
264
266
256

200
206
266
264
256
208

256
264
266
206

DELAY LINE AND METHOD FOR ULTRASONIC INSPECTION OF A WORKPIECE

FIELD

The present disclosure relates generally to inspection systems, and more particularly, to a delay line for use in the ultrasonic inspection of a workpiece.

BACKGROUND

Composite materials are used in a wide variety of applications, such as aircraft production. For example, composite materials are increasingly used to form the empennage, the fuselage, and the wings of an aircraft. The manufacturing of a composite article typically involves laying up multiple composite plies over a layup tool to produce a composite layup. The composite plies are comprised of a fibrous material, such as carbon fiber, impregnated with resin, such as epoxy. After the layup operation is complete, the composite layup is cured to form a composite laminate. The composite laminate is typically inspected for flaws such as wrinkles, voids, or delaminations.

Ultrasonic inspection is an effective technique for detecting flaws in composite laminates. One type of ultrasonic inspection involves the use of a phased array transducer having multiple transducer elements. To start the inspection process, the bottom surface of the phased array transducer is placed on the laminate surface, and a thin layer of coupling fluid such as water is applied at the transducer-workpiece interface to ensure that the phased array transducer is acoustically coupled to the composite laminate. During the inspection process, the phased array transducer is moved along the laminate surface while the transducer elements emit pulses of high-frequency sound energy, referred to as ultrasonic waves, which penetrate the composite laminate. When the ultrasonic waves encounter a flaw within the composite laminate, a portion of the sound energy, referred to as the echo, is reflected back to the phased array transducer. The reflected sound energy is analyzed to detect the presence of flaws in the composite laminate, and to determine the flaw characteristics, such as the type (e.g., wrinkle, void, delamination, etc.) and size (e.g., length, width, depth, etc.) of the flaws.

In certain applications, the phased array transducer is mounted on top of a delay line, and the bottom surface of the delay line is placed on the surface of the composite laminate being inspected. The delay line serves as a spacer, creating distance between the phased array transducer and the workpiece, and thereby causing a time delay between each pulse of the emitted waves and the arrival of the reflected waves. The time delay allows the emitted waves to travel into the composite laminate and reach potential flaws before the reflected waves return to the phased array transducer. In this manner, the delay line prevents interference between the emitted waves and reflected waves, which would otherwise result in reduced signal quality, and compromise the accuracy with which flaws are detected and characterized.

Conventional delay lines have several limitations that detract from their utility. For example, conventional delay lines have a rectangular shape that prevents them from being placed in radiused corners (i.e., inside corners) of a composite laminate. In the example of a composite wing spar, conventional delay lines cannot be placed closer than approximately 1 inch from the tangent point of the web-flange radius connecting the spar flange to the spar web, which hampers the ability to inspect the inside radii.

Another limitation of conventional delay lines is that the transducer mounting surface on top of the delay line is planar. The planar mounting surface restricts the use of focused phased array transducers, which are preferred for applications where high-quality inspection data is needed. Instead, only unfocused phased array transducers can be mounted on conventional delay lines. Unfocused phased array transducers emit ultrasonic waves that tend to spread in the passive direction, resulting in degraded ultrasonic data, compared to the higher quality data produced by focused phased array transducers.

To overcome the above-noted limitations associated with conventional delay lines, alternative inspection techniques must be used. For example, a bubbler-type ultrasonic probe or an immersion-type ultrasonic probe can be used for inspecting the web-flange radii and other hard-to-reach areas of a composite laminate. However, bubbler-type and immersion-type ultrasonic inspection techniques are costly and time-consuming. In addition, bubbler-type and immersion-type ultrasonic probes can only be used in areas of a manufacturing facility where water handling systems are available.

As can be seen, there exists a need in the art for a system and method that allows for the ultrasonic inspection of an entirety of a workpiece, including up to and within the inside radii of the workpiece. Preferably, the system and method also allows for the use of a focused phased array transducer for generating high quality inspection data.

SUMMARY

The above-noted needs associated with ultrasonic testing are addressed by the present disclosure, which provides a delay line configured to acoustically couple a phased array transducer to a workpiece. The delay line includes a delay line bottom portion, a delay line end portion, and a delay line top portion. The delay line bottom portion has a delay line flat surface. The delay line end portion is contiguous with the delay line bottom portion and has a delay line curved surface extending upwardly from the delay line flat surface at a delay line transition point between the delay line curved surface and the delay line flat surface. The delay line top portion has an array mounting surface configured to support a phased array transducer in a manner such that ultrasonic waves emitted by the phased array transducer pass through the delay line and exit along the delay line flat surface at least up to the delay line transition point.

Also disclosed is a delay line having a delay line bottom portion and a delay line top portion. The delay line bottom portion has a delay line surface configured to be placed in contact with a workpiece surface of the workpiece. The delay line top portion has an array mounting surface configured to support a phased array transducer in a manner such that ultrasonic waves emitted by the phased array transducer pass through the delay line and enter the workpiece. The array mounting surface comprises a convex mounting surface having a convex shape when the delay line is viewed from an end view perspective. The convex mounting surface is configured to support a transducer concave surface on a bottom side of the phased array transducer.

Additionally disclosed is a method of ultrasonically inspecting a workpiece. The method includes mounting a phased array transducer on a delay line in a manner such that a transducer concave surface on a bottom side of the phased array transducer is supported on a convex mounting surface on a delay line top portion of the delay line. The method also includes placing the delay line on a workpiece in a manner such that a delay line surface of a delay line bottom portion is in contact with a workpiece surface of the workpiece. The method additionally includes emitting ultrasonic waves from the phased array transducer causing the ultrasonic waves to pass through the delay line and enter the workpiece. Furthermore, the method includes focusing the ultrasonic waves at a desired depth within the workpiece as a result of the transducer concave surface and the convex mounting surface.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to “one version” or “a version.” Instances of the phrases “one version” or “a version” do not necessarily refer to the same version. Similarly, this specification includes references to “one example” or “an example.” Instances of the phrases “one example” or “an example” do not necessarily refer to the same example. Particular features, structures, or characteristics may be combined in any suitable manner consistent with this disclosure.

As used herein, “comprising” is an open-ended term, and as used in the claims, this term does not foreclose additional structures or steps.

As used herein, “configured to” means various parts or components may be described or claimed as “configured to” perform a task or tasks. In such contexts, “configured to” is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word “a” or “an” should be understood as not necessarily excluding the plural of the elements or steps. As used herein, the term “and/or” includes any and all combinations of one or more of the associated listed items. As also used herein, the term “combinations thereof” includes combinations having at least one of the associated listed items, wherein the combination can further include additional, like non-listed items.

As used herein, the phrase “at least one of,” when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figures 1, 2:
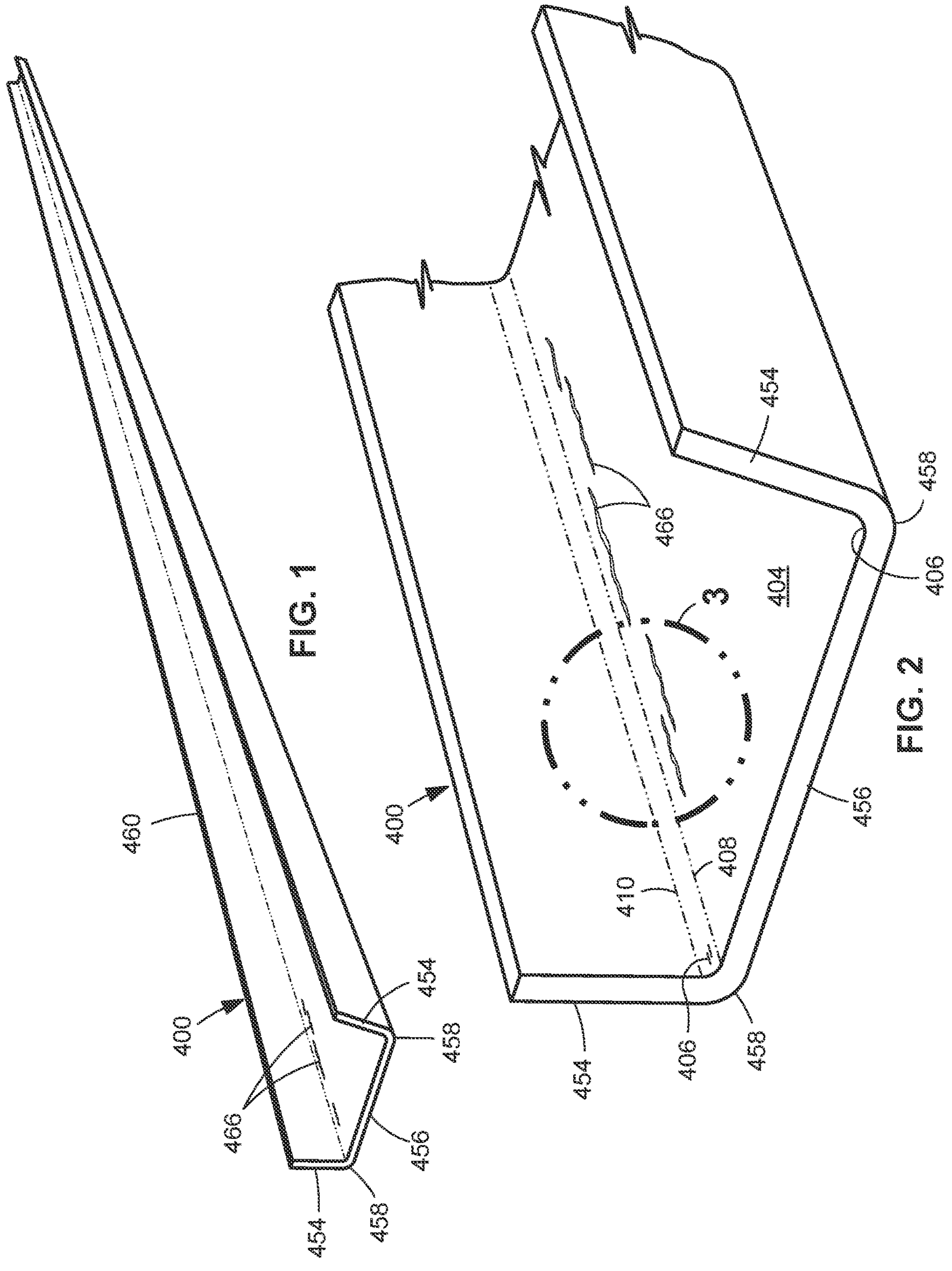
FIG. 1 is a perspective view of a composite wing spar.
FIG. 2 is a magnified view of the end portion of the wing spar of FIG. 1.
Figure 3:
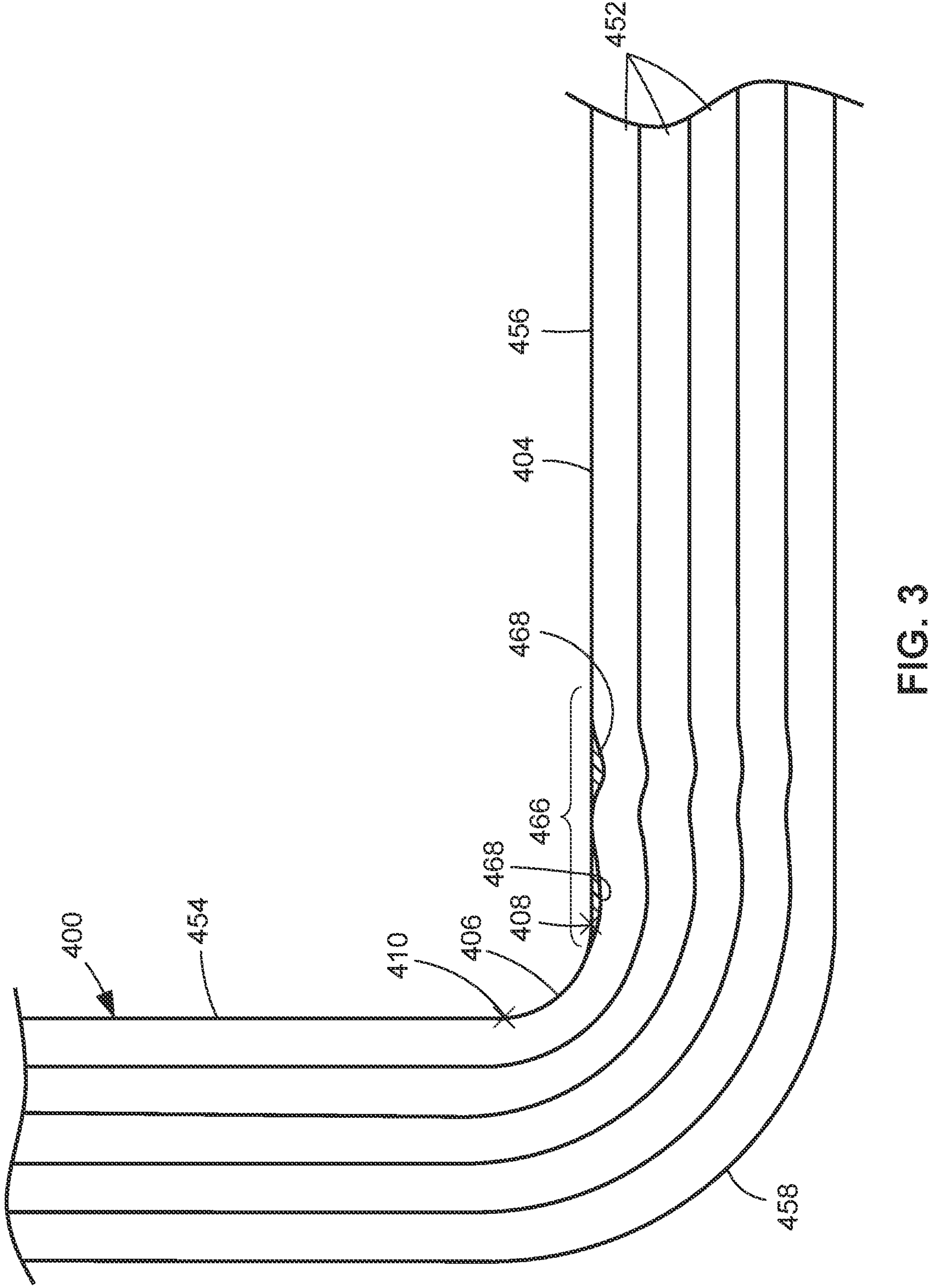
FIG. 3 is a cross-section of a portion of the wing spar showing wrinkles in the composite plies that make up the wing spar.
Figure 4:
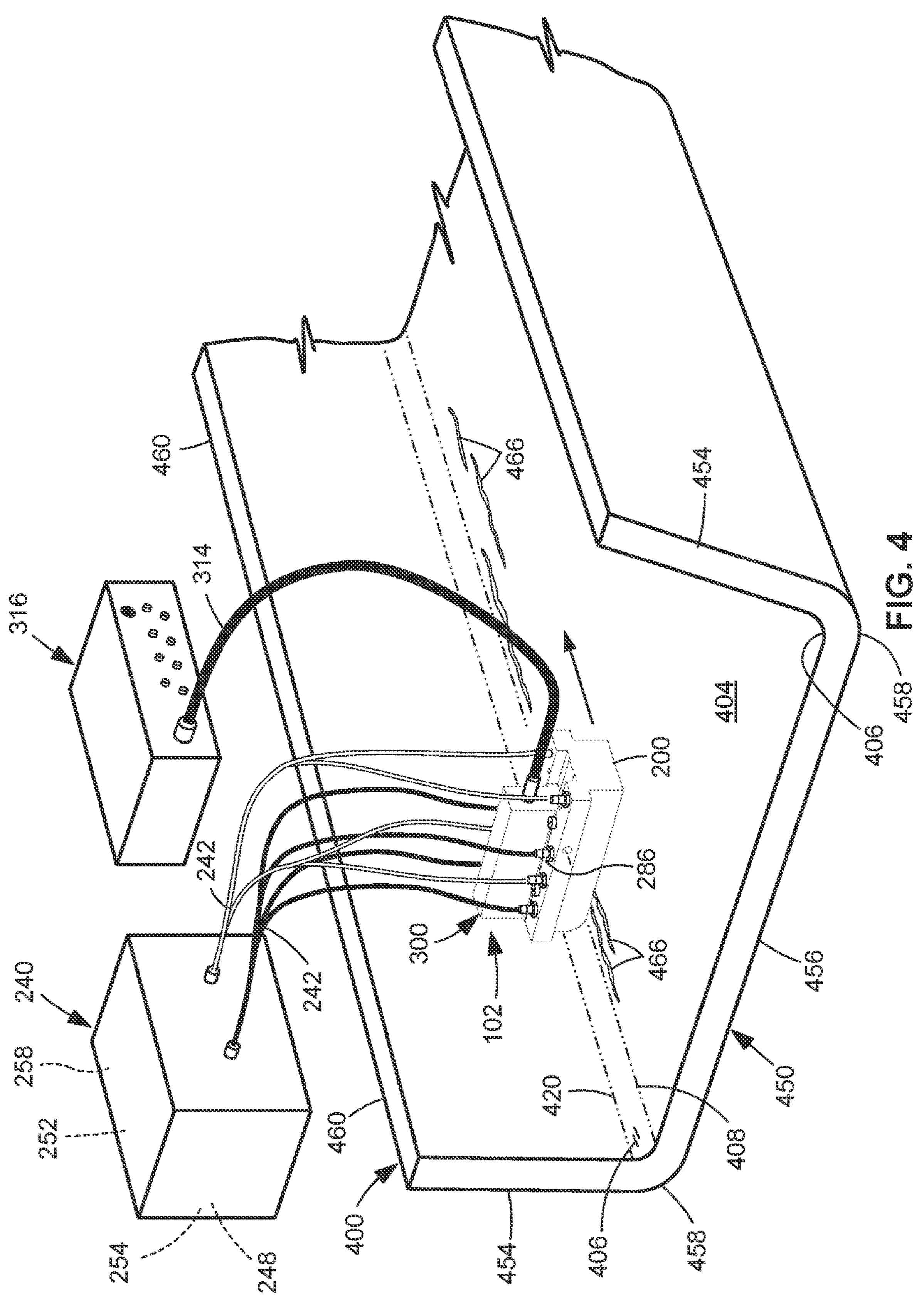
FIG. 4 shows an example of a probe assembly comprising a phased array transducer mounted on a delay line for ultrasonically inspecting the wing spar.

Referring now to the drawings which illustrate various examples of the disclosure, shown in FIGS. 1-3 is a workpiece 400 in the form of a composite wing spar 460, and which is used as an example for describing the presently disclosed probe assembly 100 (FIG. 4). As shown in FIGS. 4-19 and described in greater detail below, the probe assembly 100 comprises a delay line 200 and a phased array transducer 300, which is mountable on top of the delay line 200.

In FIGS. 1-3, the wing spar 460 (i.e., the workpiece 400) includes a pair of flanges 454 and a web 456 which interconnects the flanges 454 to thereby form a C-shaped cross section of the wing spar 460. Each of the flanges 454 is connected to the web 456 by a web-flange radius 458 (i.e., an inside radius) as shown in FIG. 3. As mentioned above, the wing spar 460 is a composite laminate 450, and is manufactured by laying up and curing a stack of composite plies 452 (FIG. 3) on a layup tool (not shown). The composite plies 452 are comprised of fibrous material (e.g., carbon fibers) and resin (e.g., epoxy). At the conclusion of the curing process, the composite wing spar 460 is typically inspected for flaws such as wrinkles 466, voids, delaminations, foreign object debris (FOD) or other flaws or defects.

FIGS. 1-4 show out-of-plane wrinkles 466 in the composite plies 452. Such wrinkles 466 may be accompanied by concave pockets on the tool side 462 of the composite laminate 450, and which fill with resin (i.e., resin pockets 468) during the curing process. In FIGS. 1-4, the wrinkles 466 are shown extending along a lengthwise direction of the wing spar 460, and are located in close proximity to the web-flange radius 458. The web 456 and the flanges 454 each define a workpiece flat surface 404. Each of the web-flange radii 458 defines a workpiece concave surface 406. In the present disclosure, the transition from the workpiece flat surface 404 defined by the web 456 to the workpiece concave surface 406 defined by the web-flange radius 458 is referred to as the lower workpiece transition point 408, and is shown as a phantom line in FIGS. 2 and 4. The transition from the workpiece flat surface 404 defined by each flange 454 to the workpiece concave surface 406 defined by the web-flange radius 458 is referred to as the upper workpiece transition point 410, and is also shown as a phantom line in FIGS. 2 and 4.

Advantageously, the presently disclosed delay line 200 allows for the ultrasonic inspection of the entirety of the composite laminate 450. More specifically, the delay line 200 allows for the ultrasonic inspection of the entirety of the web 456, including up to the lower workpiece transition point 408 and within the web-flange radii 458. Similarly, the delay line 200 allows for the ultrasonic inspection of the entirety of each flange 454, including up to the upper workpiece transition point 410 and into the web-flange radii 458. In addition, the delay line 200 is configured to receive a focused phased array transducer 302 (FIGS. 10-11) for generating high quality inspection data, as described in greater detail below. In this regard, the delay line 200 is configured to allow a focused phased array transducer 302 to be mounted in a manner such that ultrasonic waves emitted by the transducer elements 308 overlap into the workpiece concave surface 406 (e.g., the web-flange radius 458) or other hard-to-access areas.

Figure 5:
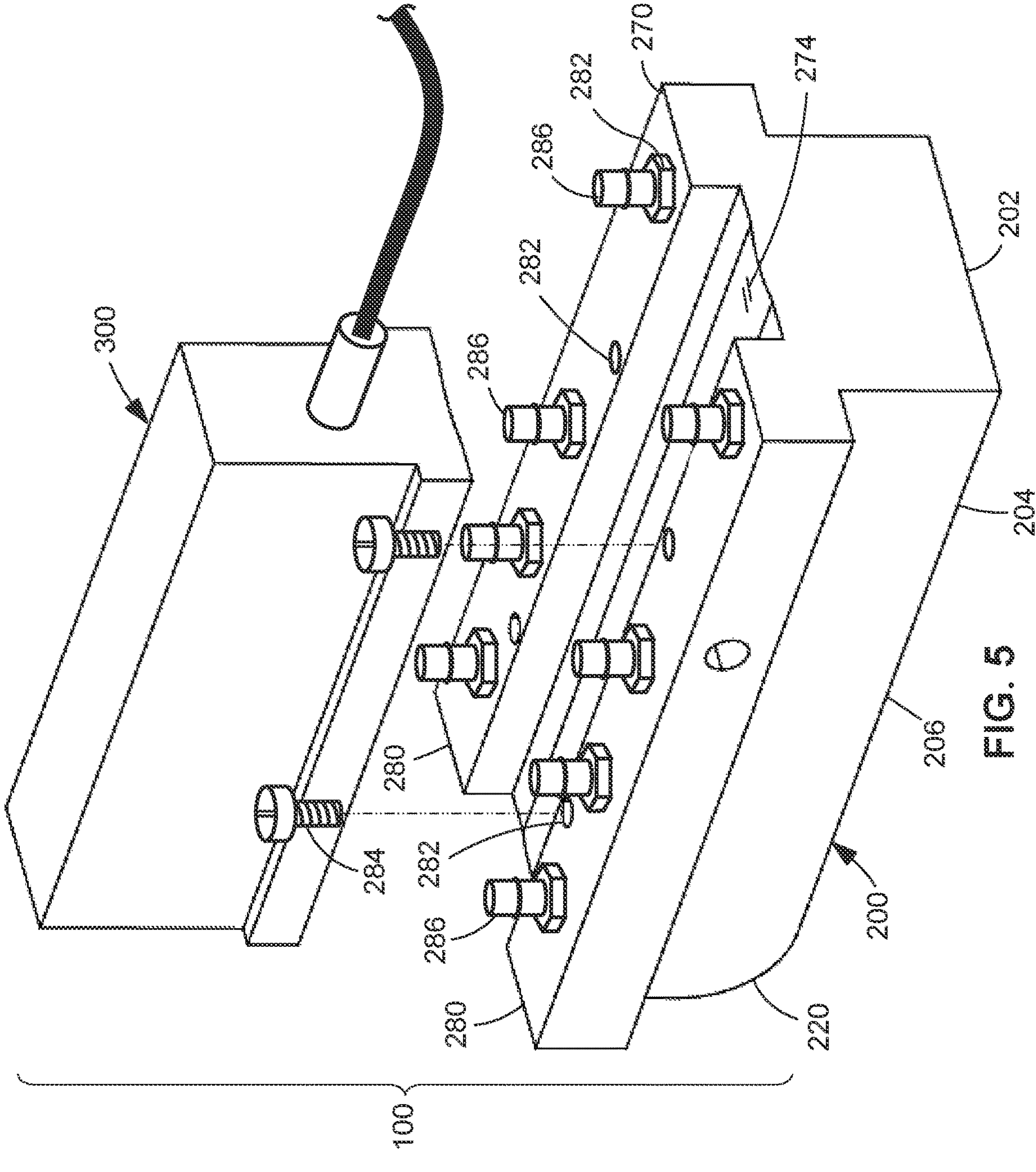
FIG. 5 is an exploded view of a phased array transducer and the presently disclosed delay line.
Figure 6:
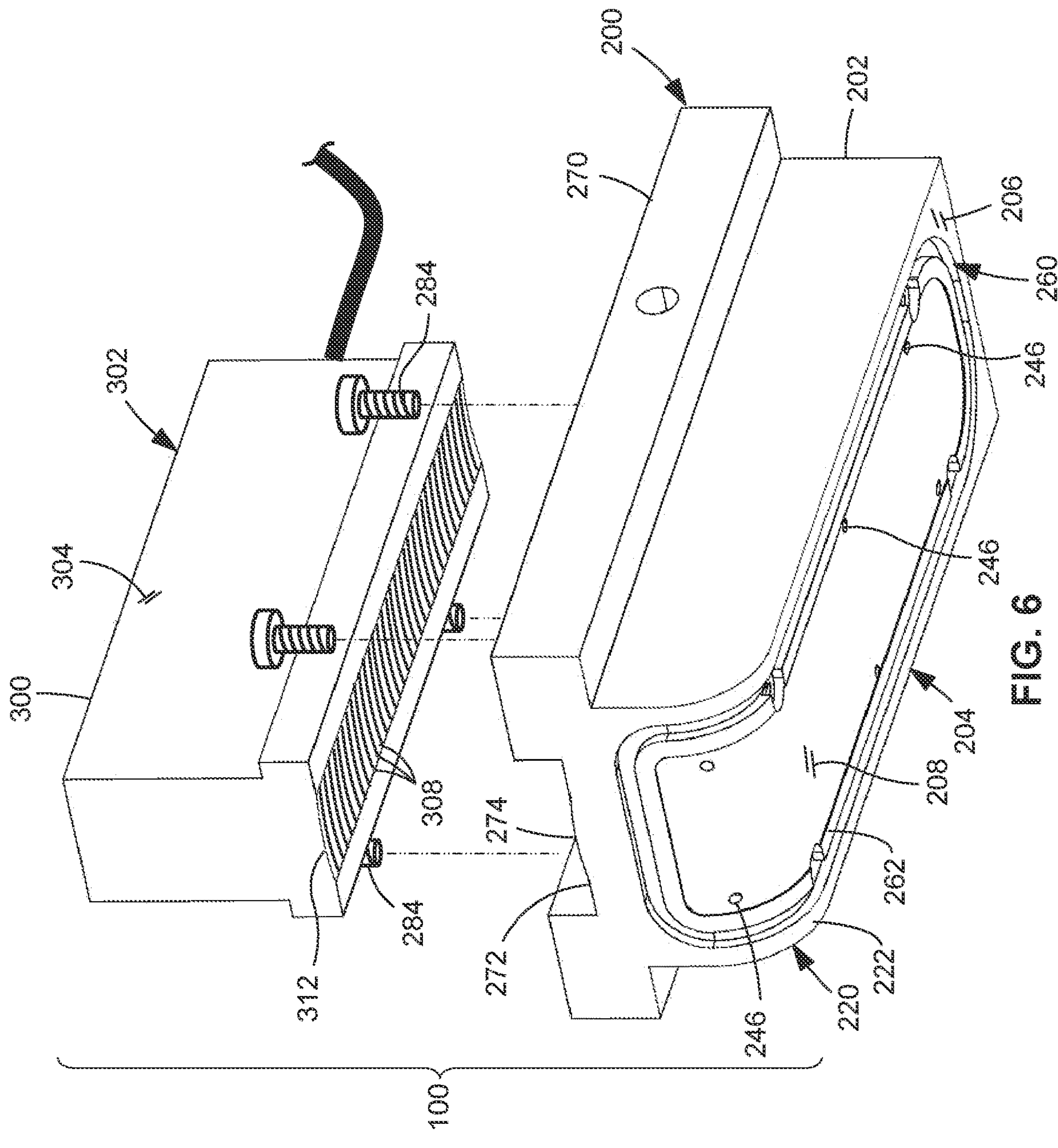
FIG. 6 is a front perspective view of the probe assembly of FIG. 5.

Referring to FIGS. 4-9, shown in FIG. 4 is an example of the probe assembly 100 positioned on the composite laminate 450 (i.e., the workpiece 400). As mentioned above, the probe assembly 100 comprises a delay line 200 and a phased array transducer 300. The phased array transducer 300 has a plurality of piezoelectric transducer elements 308 (FIG. 6) arranged in a linear array and housed in a transducer case 304 (FIG. 6). In one example, the phased array transducer 300 can have up to 128 transducer elements 308 or more. As shown in FIG. 6, the transducer elements 308 are arranged parallel to each other and perpendicular to the lengthwise direction of the linear array. The delay line 200 can be configured to receive an unfocused phased array transducer (not shown), or a focused phased array transducer 302 (FIG. 6) as described in greater detail below. In some examples, the phased array transducer 300 can be an immersible phased array transducer.

Figure 7:
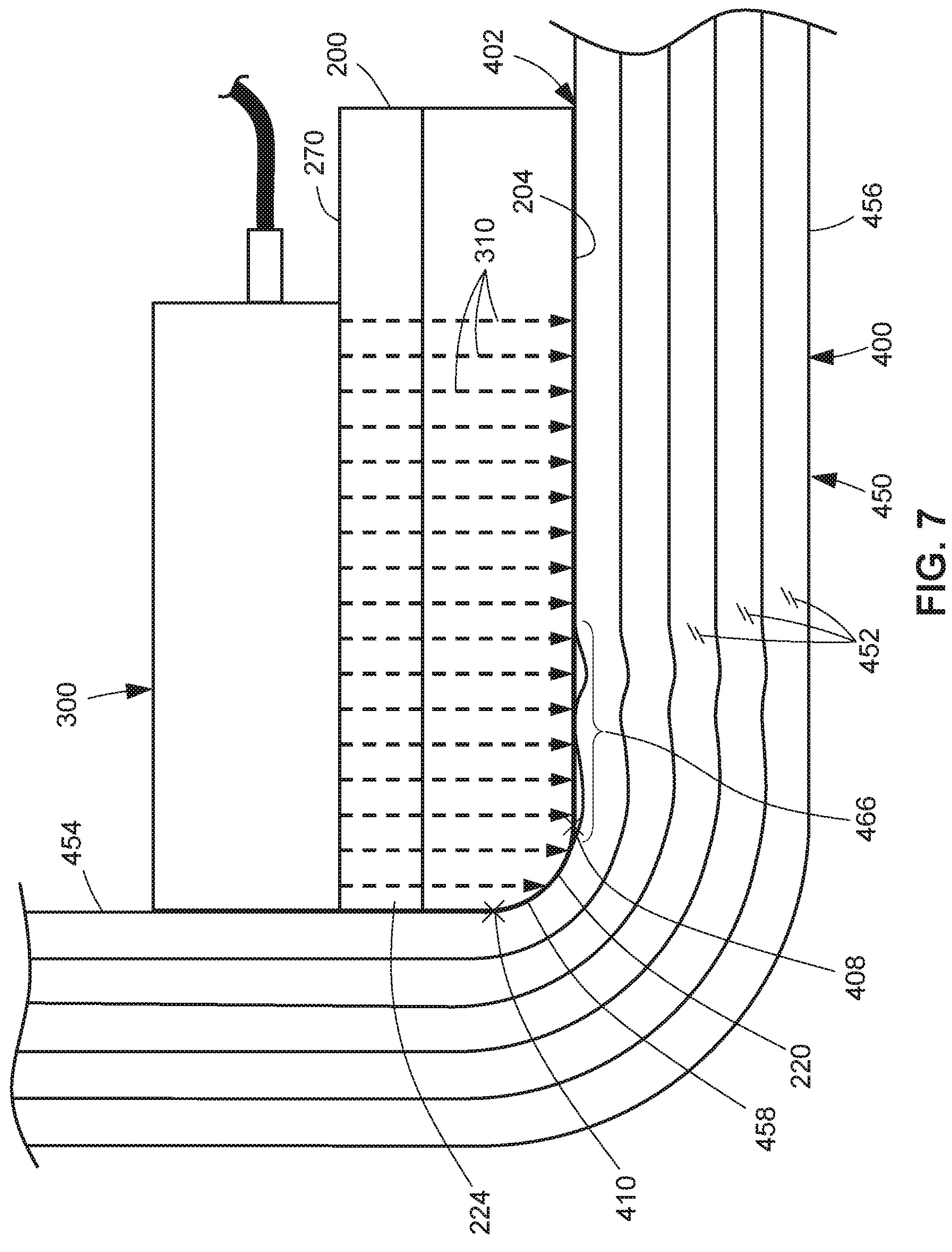
FIG. 7 shows an example of the probe assembly positioned against the wing spar and illustrating ultrasonic waves emitted by the phased array transducer, and which are represented by a plurality of rays that pass through the delay line before entering the composite plies of the wing spar.
Figure 8:
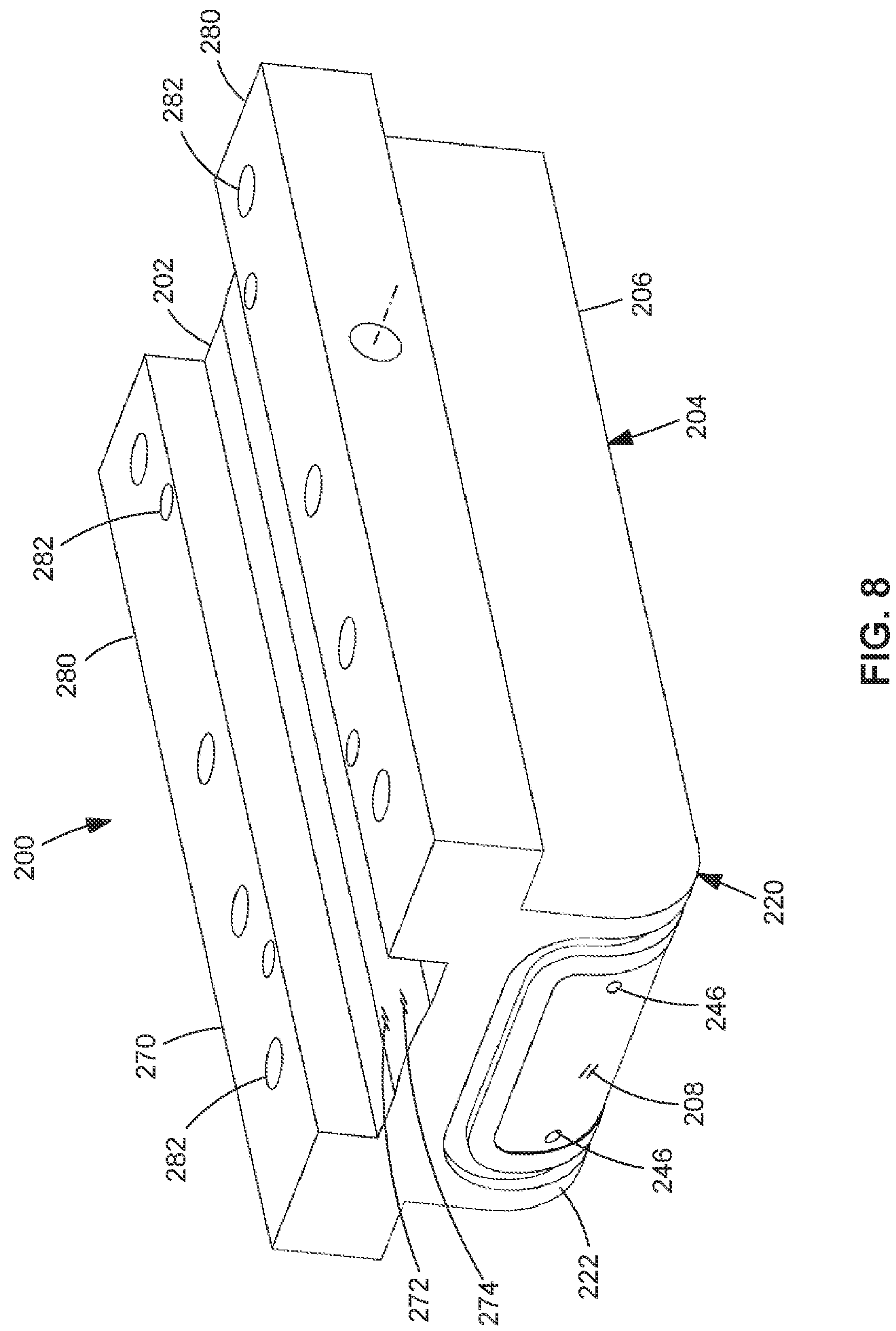
FIG. 8 is a top perspective view of the example of the delay line of FIG. 7.
Figure 9:
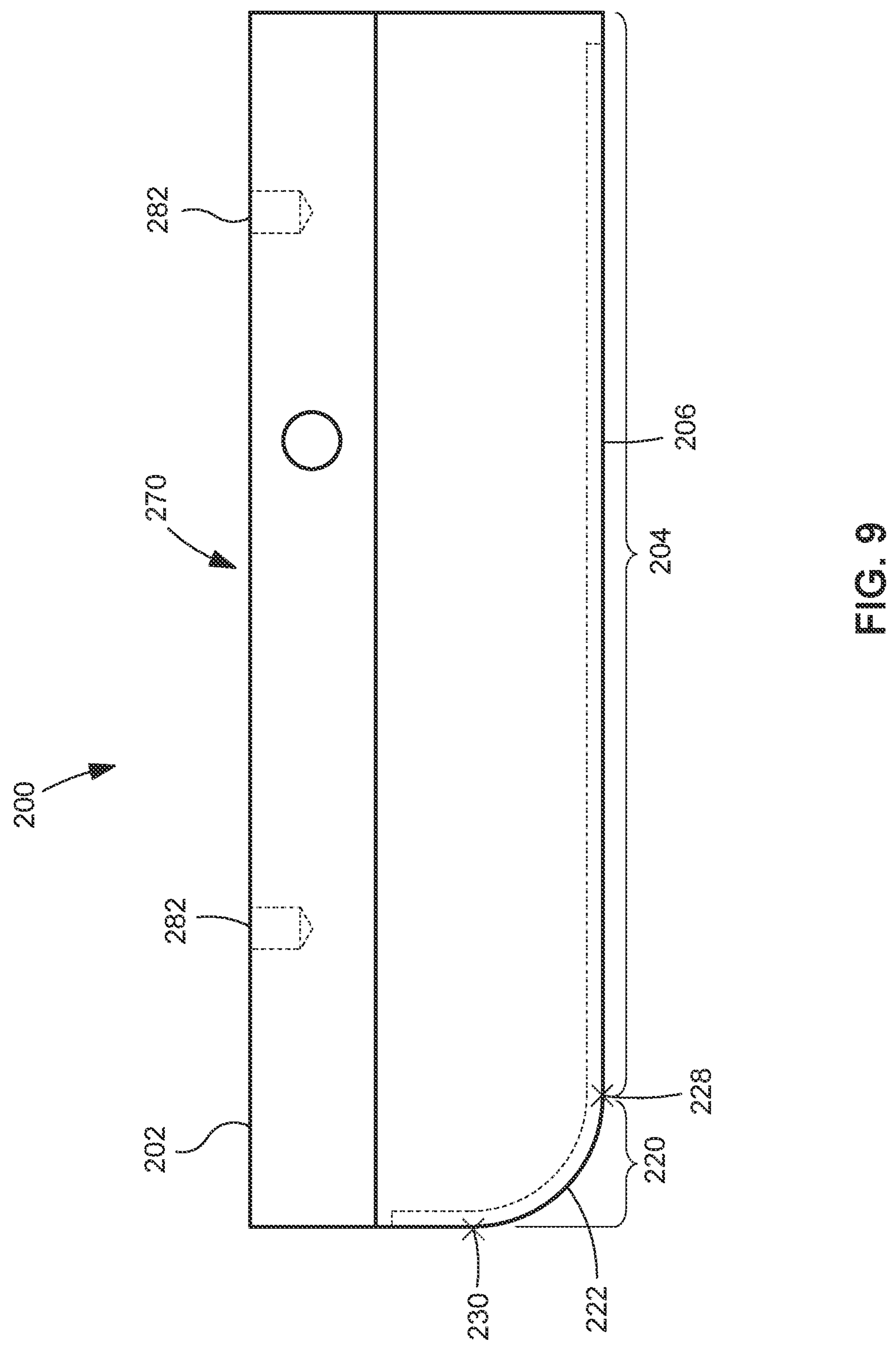
FIG. 9 is a side view of the delay line of FIG. 8.

The series of transducer elements 308 are individually excited to emit pulses of ultrasonic waves. As shown in FIG. 7, the ultrasonic waves emitted by the transducer elements 308 are represented as rays 310 that pass through the delay line 200 before entering the workpiece 400. The transducer elements 308 are driven by a phased array ultrasonic pulser 316 (FIG. 4), which is coupled to the phased array transducer 300 via a transducer cable 314 (e.g., a Cat 5 cable), as shown in FIG. 4. The phased array ultrasonic pulser 316 also receives and digitizes the reflected waves (i.e., the echo), and plots the echo (i.e., the reflected waves) information in various formats.

As shown in the figures, the phased array transducer 300 is mounted on top of the delay line 200, and the delay line 200 is placed on the surface of the workpiece 400 under inspection. The delay line 200 functions as a spacer, creating distance between the phased array transducer 300 and the workpiece 400, and thereby causing a time delay between each pulse of the emitted waves and the arrival of the reflected waves, thereby avoiding interference between the emitted waves and the reflected waves.

FIG. 4 shows an irrigation system 240 for providing coupling fluid 254 (e.g., water) to the delay line-workpiece interface 402 (FIG. 7) between the delay line 200 and the workpiece 400. The coupling fluid 254 acoustically couples the delay line 200 to the workpiece 400, and thereby facilitates the transmission of the emitted ultrasonic waves from the delay line 200 into the workpiece 400, and the transmission of the reflected ultrasonic waves from the workpiece 400 into the delay line 200.

The delay line 200 has a delay line body 202. The delay line body 202 is preferably formed of a material having acoustic properties similar to the acoustic properties of the coupling fluid 254, such as water. For example, the delay line body 202 can be formed of a thermosetting plastic such as polystyrene, or any other suitable material having acoustic properties similar to that of the coupling fluid 254.

The delay line body 202 is comprised of a delay line bottom portion 204, a delay line end portion 220, and a delay line top portion 270. The delay line bottom portion 204 has a delay line flat surface 206 configured to be placed on a workpiece flat surface 404. The workpiece flat surface 404 can be described as a locally flat region of the workpiece 400.

The delay line end portion 220 is contiguous with the delay line bottom portion 204 and has a delay line curved surface 222 extending upwardly from the delay line flat surface 206 at a lower delay line transition point 228 (FIG. 9) between the delay line curved surface 222 and the delay line flat surface 206. The delay line curved surface 222 is convexly shaped (e.g., a cylindrical surface) and is continuous with the delay line flat surface 206.

The delay line curved surface 222 is configured (e.g., shaped and sized) complementary to the workpiece concave surface 406 of the workpiece 400 to be inspected. For example, the radius of curvature of the delay line curved surface 222 preferably matches (e.g., within 0.050 inch) the radius of curvature of the workpiece concave surface 406. The delay line flat surface 206 is tangent to the delay line curved surface 222 at the lower delay line transition point 228.

The delay line top portion 270 is located opposite the delay line bottom portion 204, and has an array mounting surface 272 configured to receive a phased array transducer 300 in a manner such that ultrasonic waves emitted by the transducer elements 308 pass through the delay line body 202 and exit along the delay line flat surface 206 at least up to the lower delay line transition point 228, after with the ultrasonic waves enter the workpiece 400 under inspection. In this manner, the delay line 200 allows for inspection of the workpiece 400 at least up to the lower workpiece transition point 408 and potentially into the workpiece concave surface 406, depending on the forward-aft position of the phased array transducer 300 on the array mounting surface 272. For example, FIG. 7 shows a phased array transducer 300 mounted on the delay line 200 such that one end of the phased array transducer 300 is flush with the delay line end surface 224. In this arrangement, the ultrasonic waves emitted by the transducer elements 308 pass through the delay line flat surface 206 and the delay line end surface 224, thereby allowing for inspection of the web 456 and the web-flange radius 458. The probe assembly 100 can also be positioned on the flange 454 of the composite laminate 450 in a manner allow for inspection of flange 454 up to the upper workpiece transition point 410 and into the web-flange radius 458. In this manner, the delay line curved surface 222 allows for complete inspection coverage of the workpiece 400 without resorting to a bubbler-type or immersion-type inspection technique.

Figure 10:
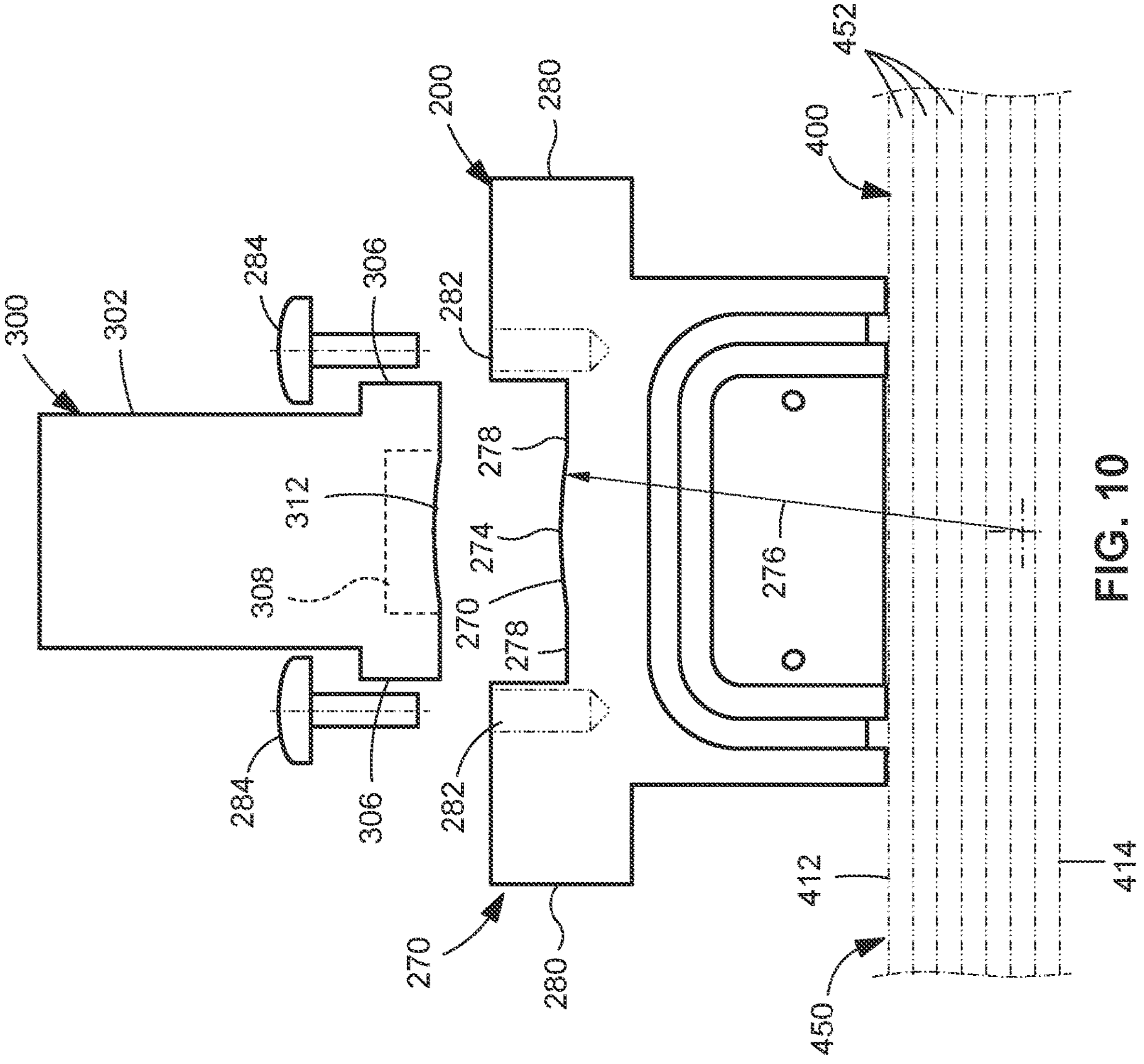
FIG. 10 is an exploded view of the probe assembly showing the phased array transducer having a transducer concave surface configured complementary to a convex mounting surface on the delay line.
Figure 11:
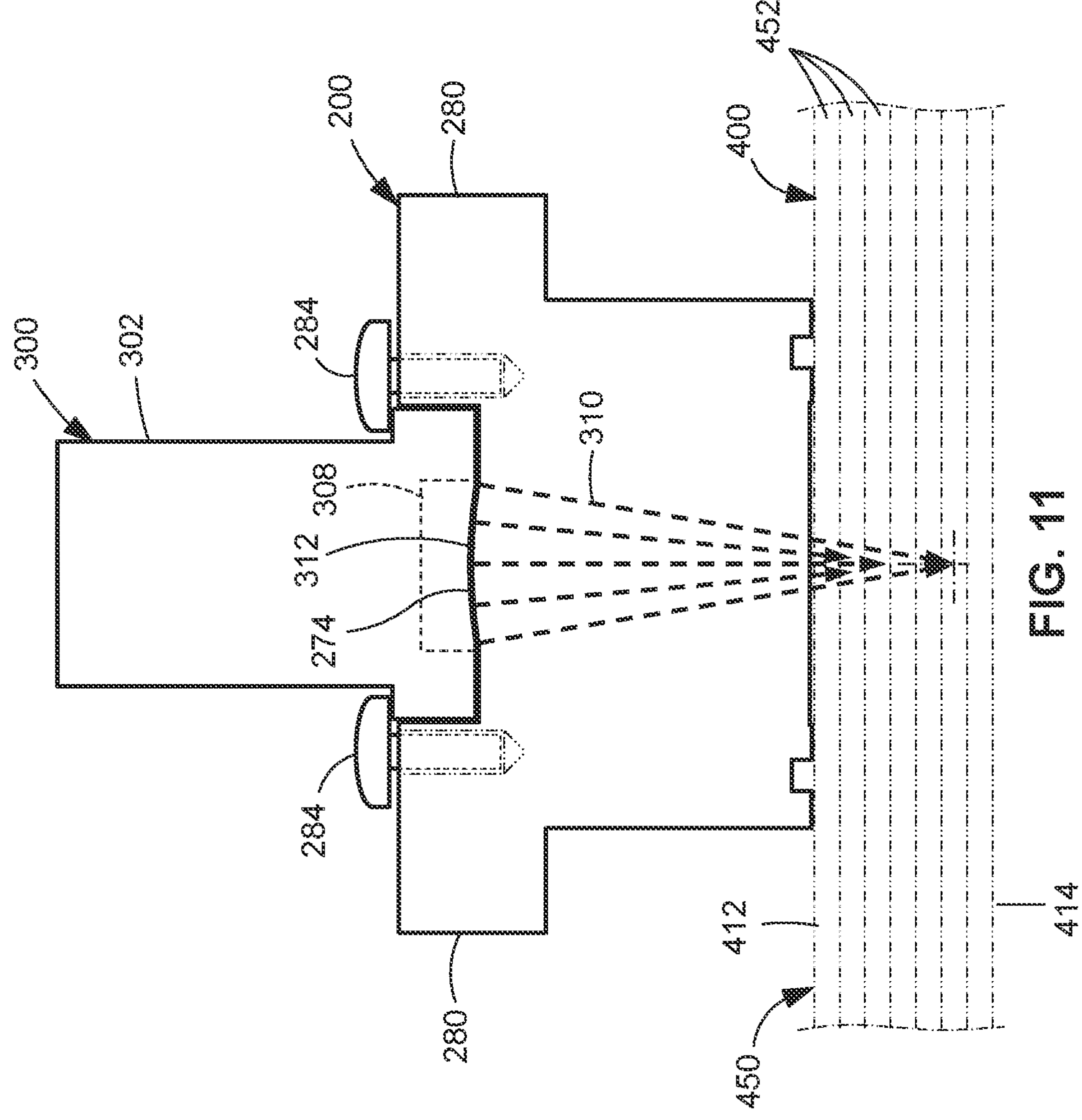
FIG. 11 is an assembled view of the probe assembly of FIG. 10 illustrating focused ultrasonic rays emitted by the transducer elements as a result of the convex mounting surface of the delay line.
Figure 12:
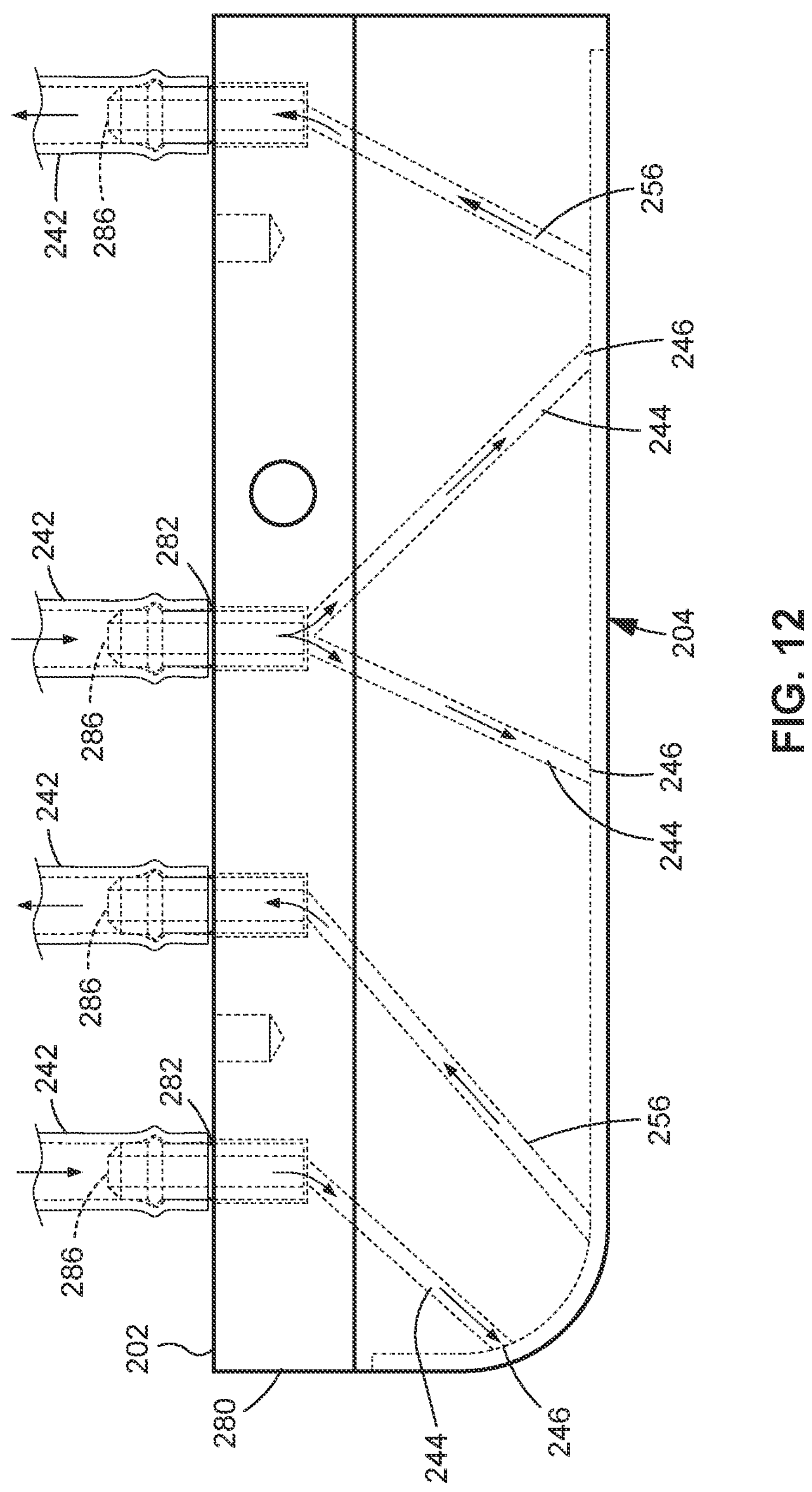
FIG. 12 is a side view of the delay line illustrating tube fittings installed in the delay line top portion and further illustrating irrigation channels and suction channels extending through the delay line body and terminating at the delay line bottom portion.
Figure 13:
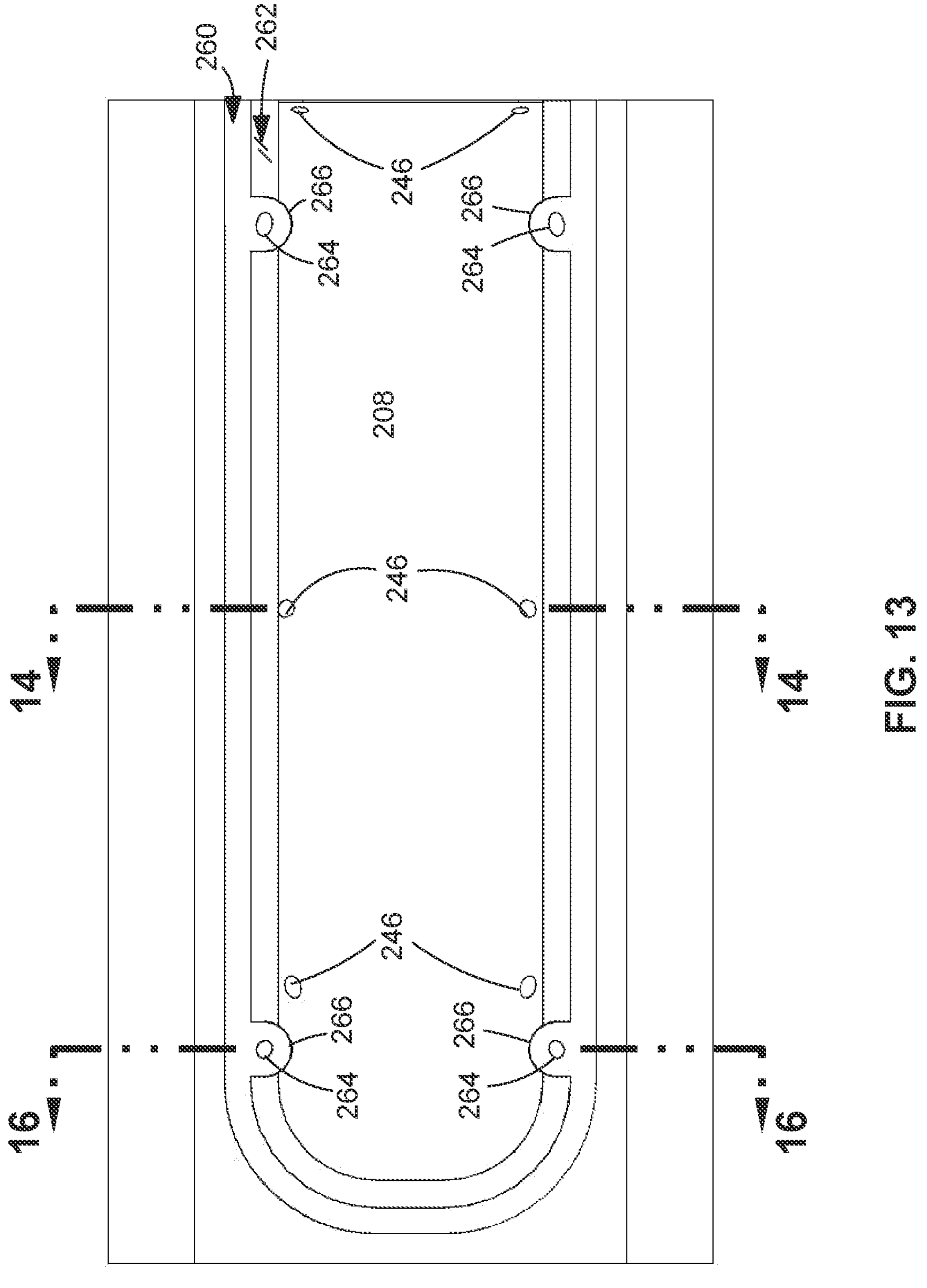
FIG. 13 is a bottom view of the delay line illustrating irrigation channel openings and suction channel openings in the recess portion of the delay line bottom portion.

Referring to FIGS. 5-6, the delay line top portion 270 has a pair of delay line shoulders 280 respectively on opposite sides of the array mounting surface 272. The delay line shoulders 280 have threaded bores 282 for receiving barbed tube fittings 286 for attaching tubing 242 (FIG. 4) as part of the irrigation system 240 (FIG. 4) described in greater detail below. The delay line shoulders 280 also have threaded bores 282 for receiving mounting screws 284 (FIGS. 10-11) for securing the transducer case shoulders 306 of the phased array transducer 300 to the delay line body 202, as shown in FIGS. 10-11.

The bottom side of the phased array transducer 300 is configured complementary to the array mounting surface 272. Prior to assembly, a coupling gel or grease (not shown) can be applied to the array mounting surface 272 and/or to the bottom side of the phased array transducer 300 to facilitate the transmission of ultrasonic waves from the transducer elements 308 into the delay line 200, and from the delay line 200 back into the phased array transducer 300. In the example of FIGS. 6, 8, 10-11, the array mounting surface 272 is a convex mounting surface 274 protruding from the planar mounting surfaces 278 on opposite sides of the convex mounting surface 274. As shown in FIGS. 10-11, the convex mounting surface 274 has a convex shape when the delay line 200 is viewed from an end view perspective. The convex mounting surface 274 is centered on the delay line top portion 270, and extends in a lengthwise direction of the array mounting surface 272, which is parallel to the lengthwise direction of the phased array transducer 300.

The convex mounting surface 274 is configured to receive a focused phased array transducer 302. In this regard, the convex mounting surface 274 is shaped and sized for receiving a transducer concave surface 312 having a cylindrical focus (i.e., a cylindrical curvature) on the bottom side of the series of transducer elements 308 of the focused phased array transducer 302, as shown in FIGS. 6, 8, 10-11. The transducer concave surface 312 of the focused phased array transducer 302 and the convex mounting surface 274 of the delay line top portion 270 cause the ultrasonic waves from the transducer elements 308 to focus at a desired depth of the workpiece 400. For example, the transducer concave surface 312 and the convex mounting surface 274 can have a radius of curvature 276 that causes the ultrasonic waves to focus at the workpiece frontside surface 412 or at the workpiece backside surface 414, to facilitate detection of out-of-plane wrinkles 466 respectively on the workpiece frontside surface 412 or the workpiece backside surface 414. The convex mounting surface 274 can have a radius of curvature 276 in the range of 0.5 to 10 inches or more. In one example, the radius of curvature 276 of the convex mounting surface 274 is approximately 2 inches (e.g., +/−0.5 inch) for inspecting a composite laminate 450 such as the above-described wing spar 460.

As an alternative to a convex mounting surface 274, the array mounting surface 272 can be planar for receiving an unfocused phased array transducer (not shown) for which the bottom side of the transducer elements 308 are planar. As mentioned above, the ultrasonic waves emitted by the transducer elements 308 of an unfocused phased array transducer tend to spread in the passive direction, which can affect the resolution and quality of the ultrasonic data.

Referring to FIGS. 3-4 and 12-18, the delay line 200 can include the above-referenced irrigation system 240 (FIG. 4), which includes one or more irrigation channels 244 extending through the delay line body 202 and terminating at the delay line bottom portion 204. The irrigation channels 244 are fluidically coupled to a coupling fluid reservoir 248 via tubing 242 (e.g., flexible plastic or rubber tubing) as shown in FIG. 4. The tubing 242 is attached to the tube fittings 286 installed in the threaded bores 282 in the delay line shoulders 280 as shown in FIG. 5. The irrigation system 240 includes a coupling fluid pump 252 (e.g., a water pump) for pumping coupling fluid 254 from the coupling fluid reservoir 248 to the irrigation channels 244, as shown in FIG. 4. The irrigation channels 244 provide coupling fluid 254 (e.g., water) to the delay line-workpiece interface 402 (FIG. 7) between the delay line 200 and the workpiece 400, for acoustically coupling the delay line 200 to the workpiece 400. In the example shown, the irrigation channels 244 extend from the delay line shoulders 280 to the delay line bottom portion 204, where the irrigation channels 244 terminate at an irrigation channel opening 246 in a recessed surface 208 formed in the delay line curved surface 222 and the delay line flat surface 206.

In one example, the recessed surface 208 is formed at a depth of at least 0.010 inch, although the depth can be up to 0.050 inch or more. The recessed surface 208 and the workpiece 400 collectively define a coupling fluid chamber 210 (FIG. 15) for receiving the coupling fluid 254 from the irrigation channels 244. The recessed surface 208 can have a width that is at least as wide as the individual transducer elements 308 and a length that is preferably longer than the length of the series of transducer elements 308, to ensure complete coupling fluid coverage of the local area under the delay line 200.

Referring to FIGS. 6, 12-13, and 16-17, the irrigation system 240 can include one or more suction channels 256 extending through the delay line 200 and terminating at the delay line bottom portion 204 and/or delay line end portion 220. The suction channels 256 are fluidically coupled to a suction pump 258 (e.g., a vacuum pump) via tubing 242 as shown in FIG. 4. The tubing 242 is attached to the tube fittings 286 installed in the delay line shoulders 280 as shown in FIG. 5. The suction pump 258 is configured to draw suction pressure (e.g., vacuum pressure pump) on the suction channels 256 for recovering excess coupling fluid 254 from the delay line-workpiece interface 402, and returning the excess coupling fluid 254 to the coupling fluid reservoir 248 (FIG. 4).

Referring to FIGS. 6, 13, and 16-17, the delay line 200 can include a suction groove 260 in the delay line bottom portion 204. The suction groove 260 is in the shape of a loop that circumscribes the recessed surface 208 in the delay line curved surface 222 and the delay line flat surface 206. The suction groove 260 is separated from the recessed surface 208 by a median strip 262, which is at the same height as the portions of the delay line curved surface 222 and the delay line flat surface 206 outside of the suction groove 260. Each suction channel 256 terminates at a suction channel opening 264 in the median strip 262. Each suction channel opening 264 is surrounded by a suction channel counterbore 266 that fluidly couples the suction groove 260 to the recessed surface 208 to allow the suction groove 260 recover excess coupling fluid 254 at the delay line-workpiece interface 402. The suction groove 260 can have a depth of up to 0.050 inch or more. Advantageously, the irrigation system 240 allows the probe assembly 100 to effectively function as an immersion probe without the need to place the workpiece 400 in an immersion tank (not shown). In this regard, the irrigation system 240 provides portability to the probe assembly 100, allowing for the ultrasonic inspection of workpieces at any one of a variety of locations, including within a manufacturing facility and at off-site locations.

Figure 18:
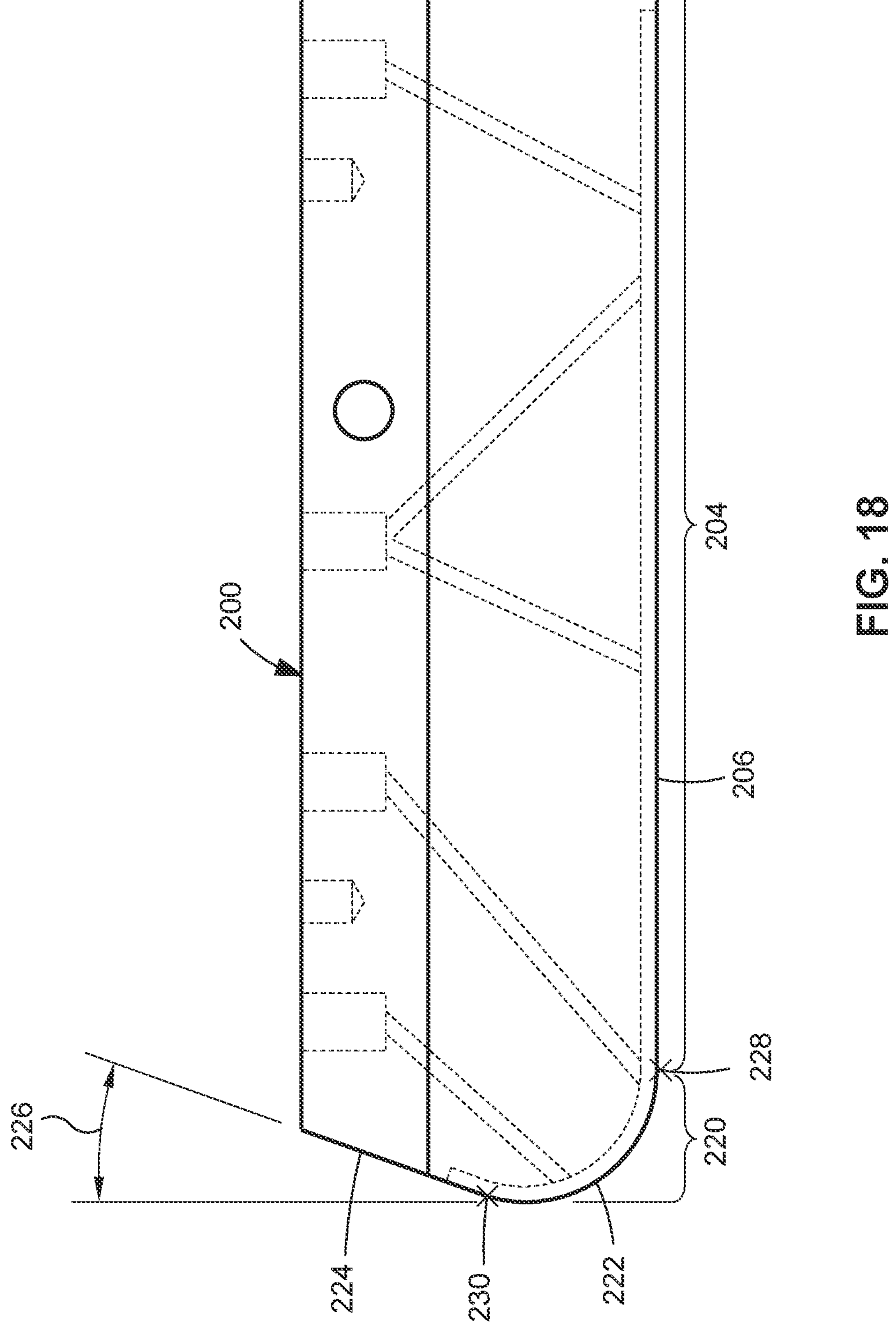
FIG. 18 is a side view of a further example of delay line having a delay line end surface that is non-perpendicular to the delay line bottom portion.

Referring to FIG. 18, shown is an example of delay line 200 having a delay line end surface 224 extending upwardly from the delay line curved surface 222 and oriented non-perpendicular to the delay line bottom portion 204, which is in contrast to the delay line 200 of FIGS. 4-17 having a delay line end surface 224 that is perpendicular to the delay line bottom portion 204. In the example of FIG. 18, the delay line end surface 224 is a flat surface oriented at an end surface angle 226 of approximately 70 degrees, for matching the angle between workpiece flat surfaces of a workpiece (not shown) under inspection. In addition, the delay line end surface 224 in FIG. 18 is tangent to the delay line curved surface 222 at the upper delay line transition point 230. As may be appreciated, the delay line end portion 220 can be oriented at any end surface angle 226 that matches the angle between the workpiece flat surfaces 404 of a workpiece 400. For example, a delay line 200 can have a delay line end surface 224 oriented at an end surface angle 226 of between 60 and 120 degrees relative to the delay line flat surface 206.

Figure 19:
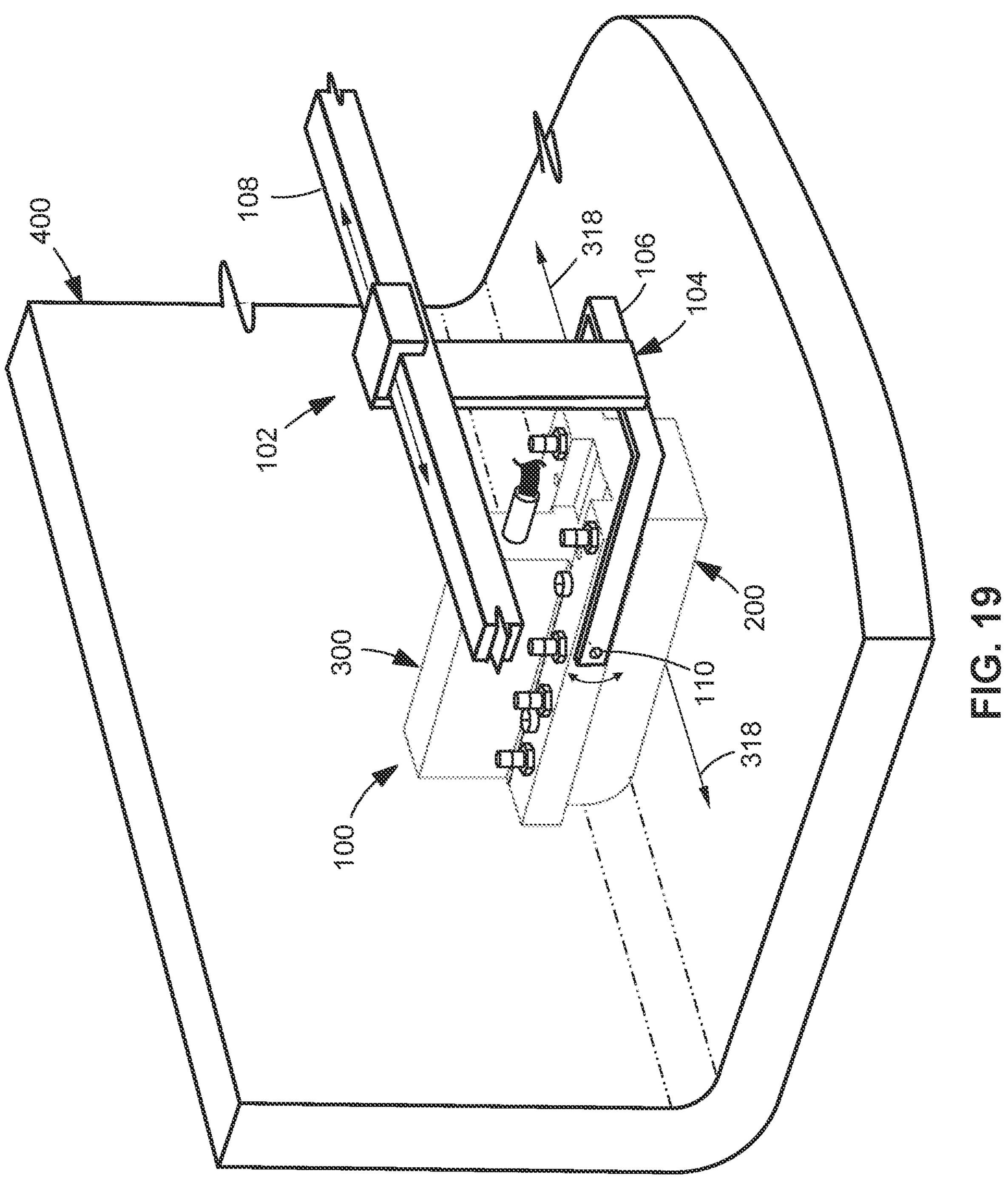
FIG. 19 is a perspective view of an example of the probe assembly supported by a probe holder that is movable along a rail.

Referring to FIG. 19, shown is an example of a probe holder 102 configured to move the probe assembly 100 along a workpiece 400 during inspection. The probe holder 102 includes a carriage 104 having a clevis fitting 106 to which the delay line 200 is pivotally coupled at a pivot joint 110. The pivot joint 110 allows the delay line 200 to pivot in correspondence with changes in the contour of the workpiece 400 surface so that the delay line 200 remains in contact with the workpiece 400. The carriage 104 is supported by a rail 108 that is parallel to the desired scanning direction 318. The probe holder 102 provides a means for automated or motorized movement of the probe assembly 100 in a controlled manner along the scanning direction 318 while maintaining the delay line 200 in alignment with the workpiece 400 surfaces. The probe assembly 100 is preferably oriented such that the lengthwise direction of the linear array is perpendicular to the scanning direction 318. The scanning direction 318 is preferably parallel to the length wise direction of the wrinkles 466 as shown in FIGS. 2-4. However, the probe assembly 100 can be oriented in any direction relative to the scanning direction 318, and the scanning direction 318 can be non-parallel to the lengthwise direction of the wrinkles 466.

Although not shown, the probe assembly 100 can optionally be mounted within a housing. Such housing can be configured to support the probe assembly 100 in orientations other than the horizontal orientation shown in FIG. 4. For example, a housing can support the probe assembly 100 in a vertical or near-vertical orientation for inspecting a vertical or near-vertical flange of a workpiece 400. The housing can be configured to support a delay line 200 having an end surface angle 226 of 90 degrees, as shown in 7. Alternatively, the housing can be configured to be adjustable for accommodating delay lines having any one of a variety of different non-perpendicular end surface angles 226. However, in still other examples, the probe assembly 100 can be moved over a workpiece 400 surface by hand without the use of a housing or a probe holder 102.

Figure 20:
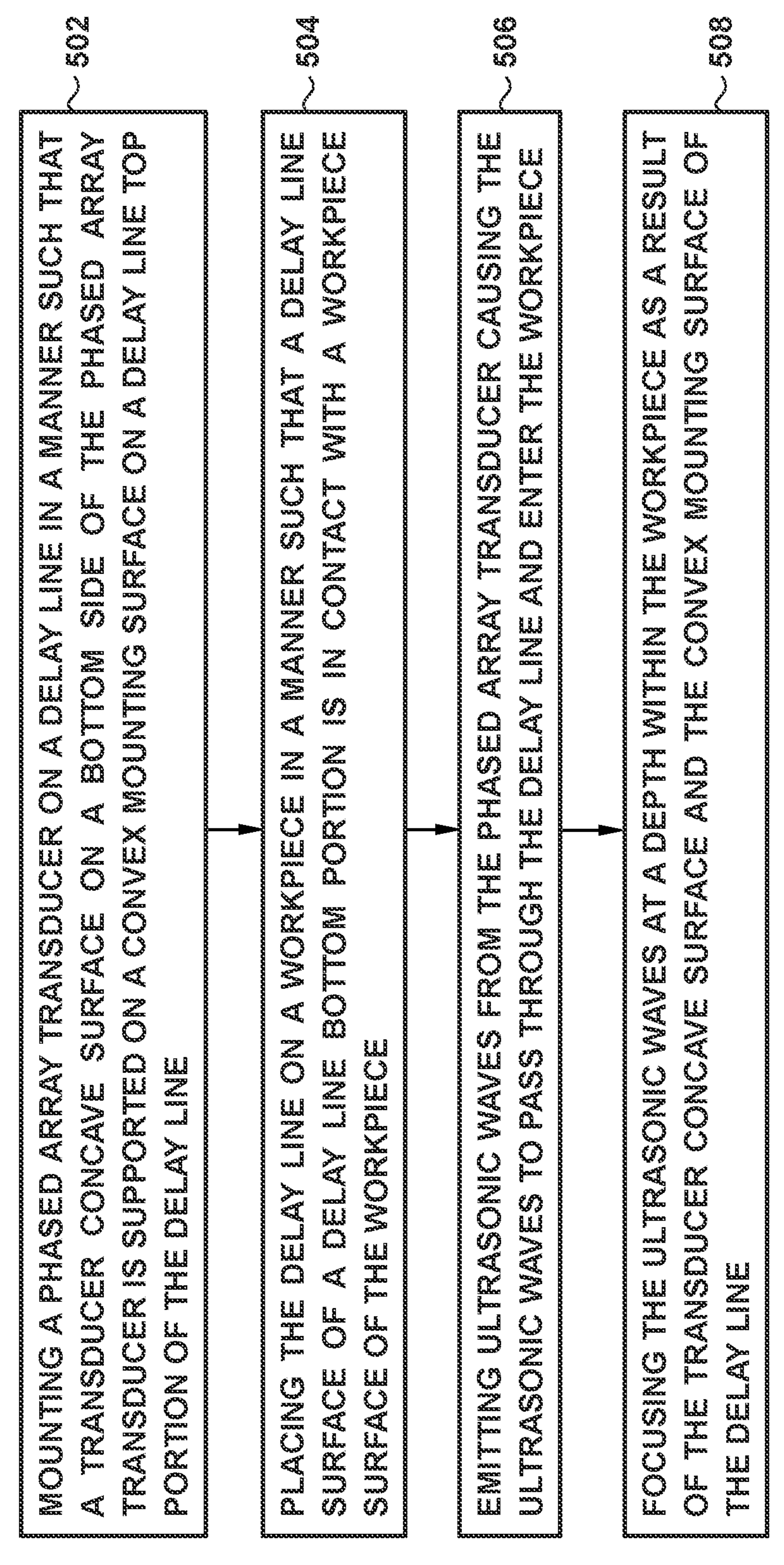
FIG. 20 is a flowchart of operations included in a method of ultrasonically inspecting a workpiece.

Referring to FIG. 20, shown is a flowchart of a method 500 of ultrasonically inspecting a workpiece 400. Step 502 of the method 500 comprises mounting a focused phased array transducer 302 on a delay line 200 in a manner such that the transducer concave surface 312 on the bottom side of the focused phased array transducer 302 is supported on a convex mounting surface 274 on the delay line top portion 270 of the delay line 200. Prior to mounting the phased array transducer 300, a coupling gel or grease (not shown) can be applied to the array mounting surface 272 and/or to the bottom side of the phased array transducer 300 to acoustically couple the phased array transducer 300 to the delay line 200. In the example of FIGS. 6, 8, 10-11 described above, the convex mounting surface 274 is configured complementary to the transducer concave surface 312 which, in the example shown, has a cylindrical curvature on the bottom side of the transducer elements 308.

Step 504 of the method 500 comprises placing the delay line 200 on a workpiece 400 in a manner such that a delay line 200 surface of the delay line bottom portion 204 is in contact with a workpiece 400 surface. In the example of FIG. 4, the delay line 200, with phased array transducer 300 mounted on top, is placed on the workpiece frontside surface 412, which is the tool side 462 of the composite laminate 450. The composite laminate 450 contains out-of-plane wrinkles 466 in the composite plies 452, which are visible on the tool side 462 as shown in FIG. 3. The probe assembly 100 is preferably placed on the composite laminate 450 such that the series of transducer elements 308 are perpendicular to the lengthwise direction of the wrinkles 466, which is preferably the scanning direction 318 of the probe assembly 100.

Figures 14, 15:
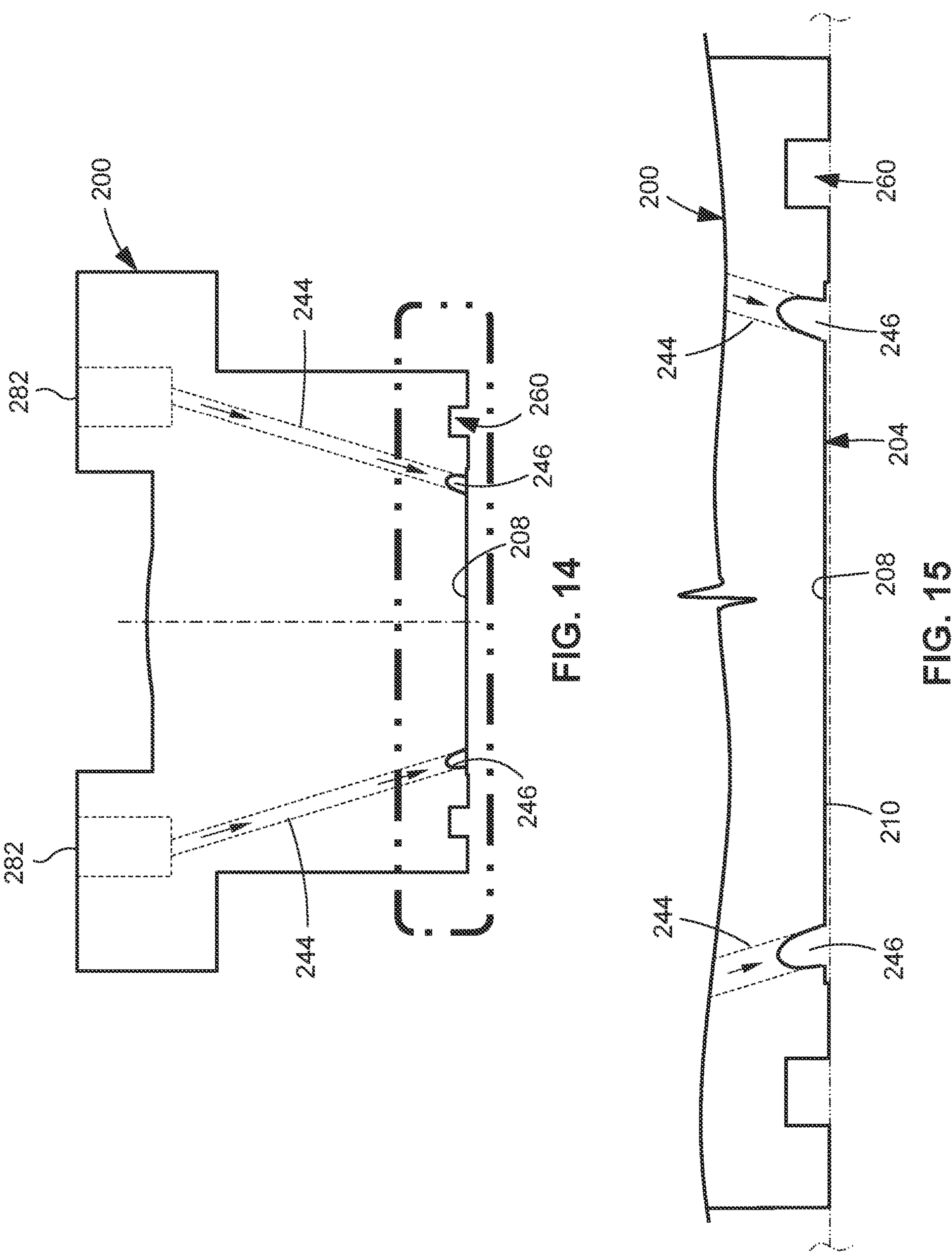
FIG. 14 is a sectional view taken along line 14-14 of FIG. 13 and illustrating the irrigation channels extending through the delay line and terminating at a recessed surface in the delay line bottom portion.
FIG. 15 is a magnified view of the portion of the delay line identified by reference numeral 15 of FIG. 14, and illustrating the irrigation channel opening into the recessed surface in the delay line bottom portion, and further illustrating a suction groove circumscribing the recessed surface.
Figures 16, 17:
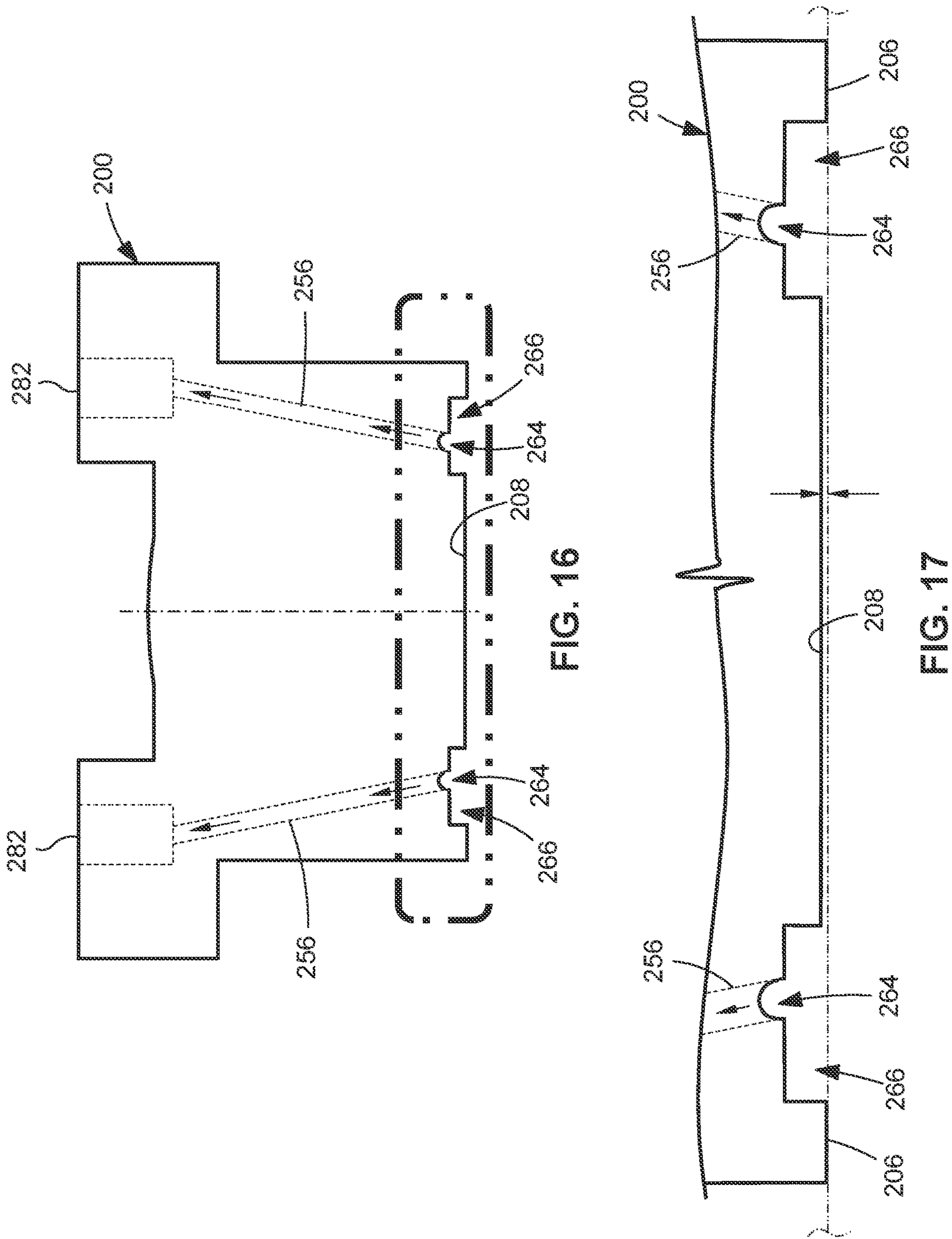
FIG. 16 is a sectional view taken along line 16-16 of FIG. 13 and illustrating the suction channels extending through the delay line body and terminating at a median strip separating the suction groove from the recessed surface.
FIG. 17 is a magnified view of a portion of delay line identified by reference numeral 17 of FIG. 16, and illustrating the suction channels opening into the median strip.

During inspection, the method 500 can include providing coupling fluid 254 to the delay line-workpiece interface 402 between the delay line 200 and the workpiece 400, via one or more irrigation channels 244 extending through the delay line 200. As shown in FIGS. 4 and 12-15, the irrigation channels 244 receive fluid from the coupling fluid reservoir 248. The coupling fluid pump 252 (e.g., a water pump) pumps the coupling fluid 254 from the coupling fluid reservoir 248, through the tubing 242, and into the irrigation channels 244 which extend through the delay line body 202 and terminate at the delay line bottom portion 204. The method 500 includes receiving, from the irrigation channels 244, the coupling fluid 254 at the coupling fluid chamber 210 defined by the workpiece 400 surface and the recessed surface 208, as shown in FIG. 15.

In some examples, the method 500 can include recovering excess coupling fluid 254 from the delay line-workpiece interface 402 via suction pressure applied to one or more suction channels 256 extending through the delay line 200 and terminating at the delay line-workpiece interface 402. In the example of FIG. 6, the delay line bottom portion 204 has a suction groove 260 circumscribing the recessed surface 208. The suction groove 260 is fluidically coupled to the recessed surface 208 via the suction channel counterbores 266 in the median strip 262 separating the suction groove 260 from the recessed surface 208. As described above, the suction channels 256 are fluidically coupled to a suction pump 258 (e.g., a vacuum pump) via the tubing 242 shown in FIG. 4. The suction pump 258 applies suction pressure to the suction channels 256 for drawing excess coupling fluid 254 from the recessed surface 208 at the delay line-workpiece interface 402, and returning the excess coupling fluid 254 to the coupling fluid reservoir 248 (FIG. 4).

Step 506 of the method 500 comprises moving the probe assembly 100 along the workpiece 400 surface while emitting ultrasonic waves from the phased array transducer 300, causing the ultrasonic waves to pass through the delay line body 202 and enter the workpiece 400. The transducer elements 308 are driven by a phased array ultrasonic pulser 316, an example of which is shown in FIG. 4. The probe assembly 100 can be moved by hand, or the probe assembly 100 can be moved using a probe holder 102 (e.g., FIG. 19), which allows for motorized movement of the probe assembly 100 in a controlled manner along the scanning direction 318 while maintaining the delay line 200 in constant contact with the workpiece 400 surfaces.

Step 508 of the method 500 comprises focusing the ultrasonic waves at a depth within the workpiece 400 as a result of the transducer concave surface 312 and the convex mounting surface 274 of the delay line 200. The radius of curvature 276 of the transducer concave surface 312 and the convex mounting surface 274 causes the ultrasonic waves emitted by the transducer elements 308 to focus at a desired depth of the workpiece 400, as shown in FIG. 11. In other examples, the transducer concave surface 312 and the convex mounting surface 274 can have a radius of curvature 276 that results in focusing the ultrasonic waves on the workpiece frontside surface 412 (e.g., the tool side 462) or on the workpiece backside surface 414 (e.g., the bag side 464), for detecting flaws respectively on the workpiece frontside surface 412 or the workpiece backside surface 414. However, the transducer concave surface 312 and the convex mounting surface 274 can have any radius of curvature 276 for focusing the ultrasonic waves at any depth within the workpiece 400.

As mentioned above, when the ultrasonic waves encounter a flaw within the workpiece 400, the ultrasonic waves are reflected back to the phased array transducer 300. The reflected waves are analyzed to determine the type of flaw (e.g., wrinkle, void, delamination, etc.) and the size (e.g., length, width, depth, etc.) or severity of the flaw. The information can also be plotted in various formats.

Referring to FIGS. 4-9, in some examples, step 502 comprises mounting a phased array transducer 300 on a delay line 200 having a delay line end portion 220 that is contiguous with the delay line bottom portion 204, and which has a delay line curved surface 222 that extends upwardly from a delay line flat surface 206 at a delay line 200 transition point between the delay line curved surface 222 and the delay line flat surface 206. For examples where the delay line end portion 220 has a delay line curved surface 222, the phased array transducer 300 can be either a focused phased array transducer 302 as described above and shown in FIGS. 6, 8, 10-11, or an unfocused phased array transducer (not shown) in which the bottom side of the transducer elements 308 are planar (not shown). For an unfocused phased array transducer, the array mounting surface 272 on the delay line 200 can be also planar (not shown).

For examples where the delay line end portion 220 has a delay line curved surface 222, the above-described step 504 comprises placing the delay line 200 on the workpiece 400 in a manner such that the delay line curved surface 222 and the delay line flat surface 206 are in contact respectively with a workpiece flat surface 404 and a workpiece concave surface 406, as shown in FIGS. 4 and 7. Also for examples where the delay line end portion 220 has a delay line curved surface 222, the above-described step 506 comprises emitting ultrasonic waves from the phased array transducer 300 in a manner such that the ultrasonic waves enter the workpiece 400 at least up to a workpiece 400 transition point between the workpiece flat surface 404 and the workpiece concave surface 406. For example, FIG. 7 shows an example where the lengthwise position of the phased array transducer 300 on the delay line 200 is such that ultrasonic waves enter the web-flange radius 458 (i.e., the workpiece concave surface 406) of the composite laminate 450. In this manner, the delay line 200 allows for inspection of the workpiece 400 at least up to the lower workpiece transition point 408 and potentially into the workpiece concave surface 406, depending on the forward-aft location of the phased array transducer 300 on the array mounting surface 272.

Although described in the context of ultrasonically inspecting a composite wing spar 460, the presently disclosed delay line 200 can be implemented for ultrasonically inspecting any one of a variety of different types, shapes, and configuration of workpieces formed of any one of a variety of materials, and is not limited to ultrasonically inspecting composite laminates.

Many modifications and other versions and examples of the disclosure will come to mind to one skilled in the art to which this disclosure pertains having the benefit of the teachings presented in the foregoing descriptions and the associated drawings 110. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A delay line for acoustically coupling a phased array transducer to a workpiece, comprising:

a delay line bottom portion having a delay line flat surface configured to be placed in contact with a workpiece flat surface;

a delay line end portion contiguous with the delay line bottom portion and having a delay line curved surface extending upwardly from the delay line flat surface at a delay line transition point between the delay line curved surface and the delay line flat surface, and the delay line curved surface is configured to be placed in contact with a workpiece concave surface; and a delay line top portion having an array mounting surface configured to support a phased array transducer in a manner such that ultrasonic waves emitted by the phased array transducer pass through the delay line and exit along the delay line flat surface and enter the workpiece along the workpiece flat surface at least up to the delay line transition point.

2. The delay line of claim 1, wherein:

the array mounting surface comprises a convex mounting surface having a convex shape when the delay line is viewed from an end view perspective, the convex mounting surface is configured complementary to a transducer concave surface located on a bottom side of the phased array transducer.

3. The delay line of claim 2, wherein:

the convex mounting surface has a radius of curvature in the range of 0.5 to 10 inches.

4. The delay line of claim 1, further comprising:

an irrigation channel extending through the delay line and configured to provide coupling fluid to a delay line-workpiece interface between the delay line and the workpiece.

5. The delay line of claim 4, further comprising:

a recessed surface formed in the delay line curved surface and the delay line flat surface, the recessed surface and the workpiece collectively define a coupling fluid chamber at the delay line-workpiece interface for receiving the coupling fluid provided by the irrigation channel.

6. The delay line of claim 5, further comprising:

a suction channel extending through the delay line and fluidically couplable to a vacuum pump for drawing vacuum pressure on the suction channel for recovering excess coupling fluid from the delay line-workpiece interface.

7. The delay line of claim 6, further comprising:

a suction groove formed in the delay line curved surface and the delay line flat surface and circumscribing the recessed surface, the suction groove is fluidically couplable to the suction channel to facilitate recovery of the excess coupling fluid at the delay line-workpiece interface.

8. A delay line for acoustically coupling a phased array transducer to a workpiece, comprising:

a delay line bottom portion having a delay line surface configured to be placed in contact with a workpiece surface of the workpiece;

a delay line top portion having an array mounting surface configured to support a linear array of transducer elements of a phased array transducer in a manner such that ultrasonic waves emitted by the phased array transducer pass through the delay line and enter the workpiece; and wherein the array mounting surface comprises a convex mounting surface having a convex shape when the delay line is viewed from an end view perspective parallel to a lengthwise direction of the array mounting surface, the convex mounting surface is configured to support a transducer concave surface located on a bottom side of the phased array transducer, and the lengthwise direction of the array mounting surface is parallel to a lengthwise direction of the linear array.

9. The delay line of claim 8, further comprising:

a delay line end portion contiguous with the delay line bottom portion and having a delay line curved surface;

wherein:

the delay line bottom portion has a delay line flat surface;

the delay line curved surface extends upwardly from the delay line flat surface at a delay line transition point between the delay line curved surface and the delay line flat surface; and the convex mounting surface is configured to support the phased array transducer in a manner such that ultrasonic waves emitted by the phased array transducer pass through the delay line and exit along the delay line flat surface at least up to the delay line transition point, thereby allowing for inspection of the workpiece at least up to a workpiece transition point of a workpiece flat surface into a workpiece concave surface.

10. The delay line of claim 8, further comprising:

an irrigation channel extending through the delay line and configured to provide coupling fluid to a delay line-workpiece interface between the delay line and the workpiece.

11. The delay line of claim 10, further comprising:

a recessed surface formed in the delay line curved surface and the delay line flat surface, the recessed surface and the workpiece collectively define a coupling fluid chamber at the delay line-workpiece interface for receiving the coupling fluid provided by the irrigation channel.

12. The delay line of claim 11, further comprising:

a suction channel extending through the delay line and fluidically couplable to a vacuum pump for drawing vacuum pressure on the suction channel for recovering excess coupling fluid from the delay line-workpiece interface.

13. The delay line of claim 12, further comprising:

a suction groove formed in the delay line curved surface and the delay line flat surface and circumscribing the recessed surface, the suction groove is fluidically couplable to the suction channel to facilitate recovery of the excess coupling fluid at the delay line-workpiece interface.

14. A method of ultrasonically inspecting a workpiece, comprising:

mounting a phased array transducer on a delay line in a manner such that a transducer concave surface on a bottom side of the phased array transducer is supported on a convex mounting surface on a delay line top portion of the delay line, the phased array transducer having a linear array of transducer elements defining a lengthwise direction of the phased array transducer, the convex mounting surface having a convex shape when the delay line is viewed from an end view perspective parallel to a lengthwise direction of the convex mounting surface, and the lengthwise direction of the convex mounting surface is parallel to a lengthwise direction of the linear array;

placing the delay line on a workpiece in a manner such that a delay line surface of a delay line bottom portion is in contact with a workpiece surface of the workpiece;

emitting ultrasonic waves from the phased array transducer causing the ultrasonic waves to pass through the delay line and enter the workpiece; and focusing the ultrasonic waves at a desired depth within the workpiece as a result of the transducer concave surface and the convex mounting surface of the delay line.

15. The method of claim 14, wherein focusing the ultrasonic waves at a desired depth within the workpiece comprises:

focusing the ultrasonic waves on one of a workpiece frontside surface or a workpiece backside surface.

16. The method of claim 14, wherein mounting the phased array transducer on the delay line, placing the delay line on the workpiece, and emitting ultrasonic waves from the phased array transducer respectively comprise:

mounting the phased array transducer on the delay line having a delay line end portion contiguous with the delay line bottom portion, the delay line end portion having a delay line curved surface that extends upwardly from a delay line flat surface at a delay line transition point between the delay line curved surface and the delay line flat surface;

placing the delay line on the workpiece in a manner such that the delay line curved surface and the delay line flat surface are in contact respectively with a workpiece flat surface and a workpiece concave surface; and emitting ultrasonic waves from the phased array transducer in a manner such that the ultrasonic waves enter the workpiece at least up to a workpiece transition point between the workpiece flat surface and the workpiece concave surface.

17. The method of claim 14, further comprising:

providing coupling fluid to a delay line-workpiece interface between the delay line and the workpiece, via an irrigation channel extending through the delay line.

18. The method of claim 17, further comprising:

receiving, from the irrigation channel, the coupling fluid in a coupling fluid chamber collectively defined by the workpiece surface and a recessed surface formed in the delay line surface.

19. The method of claim 17, further comprising:

recovering excess coupling fluid from the delay line-workpiece interface via vacuum pressure applied to a suction channel extending through the delay line and terminating at the delay line-workpiece interface.

20. The method of claim 17, further comprising:

recovering excess coupling fluid at the delay line-workpiece interface via a suction groove circumscribing a recessed surface and fluidically coupled to the suction channel.

* * * * *